United States Patent
Engel et al.

(10) Patent No.: US 12,117,917 B2
(45) Date of Patent: Oct. 15, 2024

(54) FAIR SIMULTANEOUS COMPARISON OF PARALLEL MACHINE LEARNING MODELS

(71) Applicant: International Business Machines Corporation, Armonk, NY (US)

(72) Inventors: Robert Engel, San Francisco, CA (US); Aly Megahed, San Jose, CA (US); Eric Kevin Butler, San Jose, CA (US); Nitin Ramchandani, San Jose, CA (US); Yuya Jeremy Ong, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 625 days.

(21) Appl. No.: 17/244,707

(22) Filed: Apr. 29, 2021

(65) Prior Publication Data
US 2022/0374327 A1   Nov. 24, 2022

(51) Int. Cl.
*G06F 11/34* (2006.01)
*G06F 9/48* (2006.01)
(Continued)

(52) U.S. Cl.
CPC ........ *G06F 11/3409* (2013.01); *G06F 9/4843* (2013.01); *G06F 9/5005* (2013.01);
(Continued)

(58) Field of Classification Search
None
See application file for complete search history.

(56) References Cited

U.S. PATENT DOCUMENTS

| 9,536,293 B2 | 1/2017 | Lin et al. |
| 10,250,451 B1* | 4/2019 | Moghe ............. H04L 43/091 |

(Continued)

FOREIGN PATENT DOCUMENTS

| CN | 108694090 A | 4/2018 |
| CN | 110462591 A | 11/2019 |

(Continued)

OTHER PUBLICATIONS

Shu, N. et al., "Survey of Distributed Machine Learning Platforms and Algorithms", Computer Science, Mar. 31, 2019, vol. 46, No. 3, pp. 9-18, Yubei, Chongqing, China. (English Abstract included on p. 1).

(Continued)

*Primary Examiner* — Adam Lee
(74) *Attorney, Agent, or Firm* — Tihon Poltavets

(57) ABSTRACT

A method of using a computing device to compare performance of multiple algorithms. The method includes receiving, by a computing device, multiple algorithms to assess. The computing device further receives a total amount of resources to allocate to the multiple algorithms. The computing device additionally assigns a fair share of the total amount of resources to each of the multiple algorithms. The computing device still further executes each of the multiple algorithms using the assigned fair share of the total amount of resources. The computing device additionally compares the performance of each of the multiple based on at least one of multiple hardware relative utility metrics describing a hardware relative utility of any given resource allocation for each of the multiple algorithms.

18 Claims, 10 Drawing Sheets

(51) Int. Cl.
  *G06F 9/50* (2006.01)
  *G06F 11/30* (2006.01)
  *G06N 20/00* (2019.01)

(52) U.S. Cl.
  CPC ........... *G06F 11/302* (2013.01); *G06N 20/00* (2019.01); *G06F 2209/5011* (2013.01)

(56) References Cited

U.S. PATENT DOCUMENTS

| | | | |
|---|---|---|---|
| 10,409,939 B1* | 9/2019 | Petracca | G06F 30/3308 |
| 11,416,306 B1* | 8/2022 | Gussin | H04L 41/147 |
| 2008/0281767 A1* | 11/2008 | Garner | G05B 13/027 |
| | | | 706/25 |
| 2009/0138682 A1* | 5/2009 | Capps, Jr. | G06F 11/3466 |
| | | | 712/220 |
| 2010/0296417 A1* | 11/2010 | Steiner | H04L 67/1001 |
| | | | 370/260 |
| 2012/0017220 A1* | 1/2012 | Rajan | G06F 11/3604 |
| | | | 718/105 |
| 2012/0036264 A1* | 2/2012 | Jiang | H04L 67/02 |
| | | | 709/226 |
| 2013/0030764 A1* | 1/2013 | Chatterjee | G06F 11/3452 |
| | | | 702/182 |
| 2013/0204948 A1* | 8/2013 | Zeyliger | G06F 11/3055 |
| | | | 709/221 |
| 2014/0304200 A1* | 10/2014 | Wall | G06F 8/30 |
| | | | 706/12 |
| 2015/0170514 A1* | 6/2015 | Stenneth | G08G 1/0125 |
| | | | 701/117 |
| 2016/0342447 A1* | 11/2016 | Richter | G06F 9/5083 |
| 2017/0357533 A1* | 12/2017 | Chaganti | G06F 16/338 |
| 2018/0107513 A1* | 4/2018 | Devi | G16H 50/50 |
| 2018/0314971 A1 | 11/2018 | Chen et al. | |
| 2019/0166018 A1* | 5/2019 | Letham | H04L 41/5045 |
| 2019/0286539 A1* | 9/2019 | Gerossie, Jr. | G06F 11/3051 |
| 2019/0317844 A1* | 10/2019 | Gottschlich | G06N 3/08 |
| 2019/0354805 A1* | 11/2019 | Hind | G06F 18/253 |
| 2019/0355473 A1* | 11/2019 | Schobel | G16H 50/30 |
| 2020/0044983 A1* | 2/2020 | Zheng | H04L 47/801 |
| 2020/0126669 A1* | 4/2020 | Nuernberg | G16H 40/63 |
| 2020/0134467 A1* | 4/2020 | Dar | G06F 9/5066 |
| 2020/0210788 A1 | 7/2020 | Chinni | |
| 2020/0301739 A1* | 9/2020 | Xu | G06N 3/063 |
| 2020/0341880 A1* | 10/2020 | Sharp | G06F 11/3409 |
| 2021/0019134 A1* | 1/2021 | Rusev | H04L 41/20 |
| 2021/0097431 A1* | 4/2021 | Olgiati | G06N 5/046 |
| 2021/0117237 A1* | 4/2021 | Liu | G06F 9/5027 |
| 2021/0117868 A1* | 4/2021 | Sriharsha | G06F 17/18 |
| 2021/0149728 A1* | 5/2021 | Wood | G06F 9/5077 |
| 2021/0157644 A1* | 5/2021 | Unnikrishnan | G06F 9/5072 |
| 2021/0191759 A1* | 6/2021 | Fong | G06N 20/00 |
| 2021/0241033 A1* | 8/2021 | Yang | G06F 18/217 |
| 2021/0249136 A1* | 8/2021 | Reagan | G06N 20/00 |
| 2022/0138061 A1* | 5/2022 | Beuch | G06Q 30/04 |
| | | | 714/4.11 |

FOREIGN PATENT DOCUMENTS

| | | |
|---|---|---|
| CN | 112101576 A | 12/2020 |
| WO | 2020103440 A | 5/2020 |

OTHER PUBLICATIONS

Jing, L. et al., "Comparison and analysis of research trend prediction models based on machine learning algorithm-BP neural network, support vector machine and LSTM model", Journal of Modern Information, vol. 39 No. 4, pp. 23-33, 2019. (English Abstract included on p. 1).

International Search Report & Written Opinion dated May 30, 2022 for International Application PCT/CN2022/079186 from National Intellectual Property Administration, pp. 1-11, Beijing China.

Bekkerman, R. et al., "Scaling up machine learning: Introduction—Chapter 1 from, Scaling up machine introduction: Parallel and Distributed Approaches." Cambridge University Press, Dec. 30, 2011, pp. 1-19, United States.

Ye, K., et al. "vHadoop: A Scalable Hadoop Virtual Cluster Platform for MapReduce-Based Parallel Machine Learning with Performance Consideration." In 2012 IEEE International Conference on Cluster Computing Workshops, 2012, pp. 152-160, IEEE, United States.

Dick, T. et al., "Data driven resource allocation for distributed learning." In Artificial Intelligence and Statistics, 2017, pp. 662-671, United States.

Zhu, Q. et al., "Resource provisioning with budget constraints for adaptive applications in cloud environments." IEEE Transactions on Services Computing 5, No. 4, Jan. 2012, pp. 497-511, United States.

Dekel, O., et al. "Optimal distributed online prediction using mini-batches." The Journal of Machine Learning Research 13, 2012, pp. 165-202, United States.

Kamp, M., et al. "Effective Parallelisation for Machine Learning." Advances in Neural Information Processing Systems. arXiv preprint arXiv:1810.03530, 2018, pp. 1-12, United States.

Ma, C. et al., "Distributed Optimization with Arbitrary Local Solvers." Optimization Methods and Software, Feb. 1, 2017, pp. 813-848, vol. 32, No. 4, Taylor & Francis Group, United States.

Neiswanger, W., et al., "Asymptotically Exact, Embarrassingly Parallel MCMC." arXiv preprint arXiv:1311.4780, 2013, pp. 1-16, United States.

Sahu, A.K., et al. "On the convergence of federated optimization in heterogeneous networks." arXiv preprint arXiv:1812.06127, Dec. 2018, pp. 1-12, United States.

Mell et al., "The NIST Definition of Cloud Computing," National Institute of Standards and Technology Special Publication 800-145, Sep. 2011, 7 pages, United States.

Marculescu, D. et al., "Hardware-aware machine learning: Modeling and Optimization." In Proceedings of the International Conference on Computer-Aided Design, Nov. 5, 2018, pp. 1-8, United States.

Sze, V., et al., "Hardware for Machine Learning: Challenges and Opportunities." In 2017 IEEE Custom Integrated Circuits Conference (CICC), Apr. 30, 2017, pp. 1-8, IEEE, United States.

Shallue, C.J., et al. "Measuring the Effects of Data Parallelism on Neural Network Training." Journal of Machine Learning Research 20.112, Nov. 8, 2018, pp. 1-49, arXiv preprint arXiv:1811.03600, United States.

Talib, M.A., et al., "A systematic literature review on hardware implementation of artificial intelligence algorithms." Journal of Supercomputing, May 28, 2020, pp. 1-42, https://doi.org/10.1007/s11227-020-03325-8, Springer Link.

Anonymous, "Computational complexity of machine learning algorithms: The Kernel Trip." Apr. 16, 2018, pp. 1-14, Downloaded from: https://www.thekerneltrip.com/machine/learning/computational-complexity-learning-algorithms/, United States.

Pires, F.L., et al. "A virtual machine placement taxonomy." In 2015 15th IEEE/ACM International Symposium on Cluster, Cloud and Grid Computing, 2015, pp. 159-168. IEEE, United States.

Chang, Y. et al., "A novel energy-aware and resource efficient virtual resource allocation strategy in IaaS cloud." In 2016 2nd IEEE International Conference on Computer and Communications (ICCC), Oct. 2016, pp. 1283-1288, IEEE, United States.

Hazelwood, K., et al.,"Applied machine learning at Facebook: A Datacenter Infrastructure Perspective." In 2018 IEEE International Symposium on High Performance Computer Architecture (HPCA), 2018, pp. 620-629, IEEE, United States.

Zhang, L., et al., "Dynamic Resource Provisioning in Cloud Computing: A Randomized Auction Approach." In IEEE INFOCOM 2014—IEEE Conference on Computer Communications, 2014, pp. 433-441, IEEE, United States.

Xing, E.P., et al., "Strategies and principles of distributed machine learning on big data." Engineering 2, Jun. 2016, pp. 179-195, vol. 2, issue 2, Elsevier, Germany.

He, X., et al., "AutoML: A survey of the state-of-the-art," Knowledge-Based Systems, Jan. 5, 2021, pp. 1-37, vol. 2, United States.

(56) References Cited

OTHER PUBLICATIONS

Feurer, M. et al., "Auto-sklearn: Efficient and Robust Automated Machine Learning." In Automated Machine Learning, 2019, pp. 113-134, Springer, Cham, United States.

Thornton, C., et al., "Auto-WEKA: Combined Selection and Hyperparameter Optimization of Classification Algorithms." In Proceedings of the 19th ACM SIGKDD international conference on Knowledge discovery and data mining, Aug. 11, 2013, pp. 847-855, United States.

Li, C., et al., "The Design and Implementation of a Scalable Deep Learning Benchmarking Platform." In 2020 IEEE 13th International Conference on Cloud Computing (CLOUD), Oct. 19, 2020, pp. 414-425, IEEE, United States.

Narayanan, D. et al., "Heterogeneity-Aware Cluster Scheduling Policies for Deep Learning Workloads." In 14th {USENIX} Symposium on Operating Systems Design and Implementation ({OSDI} 20), Nov. 4, 2020, pp. 481-498, United States.

Sun, X., et al. "Fair Allocation of Heterogeneous and Interchangeable Resources." ACM Sigmetrics Performance Evaluation Review, Jan. 17, 2019, pp. 21-23, vol. 46, No. 2, ACM, United States.

Le, T.N., et al., "AlloX: Compute Allocation in Hybrid Clusters." In Proceedings of the Fifteenth European Conference on Computer Systems, Apr. 27, 2020, pp. 1-16, ACM, United States.

Mai, L., et al., "KungFu: Making Training in Distributed Machine Learning Adaptive." In 14th {USENIX} Symposium on Operating Systems Design and Implementation ({OSDI} 20), Nov. 6, 2020, pp. 937-954, United States.

Zhou, L. et al., "Machine learning on big data: Opportunities and challenges." Neurocomputing 237, 2017, pp. 350-361, Elsevier B.V., Germany.

Dick, T. et al., "Data driven resource allocation for distributed learning." In Artificial Intelligence and Statistics, 2017, pp. 662-671, United States.

\* cited by examiner

210

| Resource Type / ML Algorithm or Model ⟋405 | CPU Utility % ⟋410 | Memory Utility % ⟋415 | NW Node Bandwidth Utility % ⟋420 | Disk Utility % ⟋425 | GPU Utility % ⟋430 | Total % ⟋435 |
|---|---|---|---|---|---|---|
| CNN-Distributed ⟋440 | 20 | 20 | 20 | 10 | 30 | 100 |
| CNN-Federated ⟋450 | 15 | 15 | 30 | 10 | 30 | 100 |
| kNN - Parallel ⟋460 | 20 | 20 | 10 | 50 | 0 | 100 |
| SVM - Parallel ⟋470 | 30 | 5 | 15 | 50 | 0 | 100 |

FIG. 3

$$u_i(S_i) = \sum_{k=1}^{t} \max\left(0, v_i^k * \text{allocIdx}_k(S_i|S) - \lambda_{dist} * \text{distIdx}(S_i|S) - \lambda_{var} * \text{varIdx}_k(S_i|S)\right)$$

FIG. 4

FAIR SIMULTANEOUS COMPARISON OF PARALLEL MACHINE LEARNING MODELS

BACKGROUND

The field of embodiments of the present invention relates to fair comparison for parallel machine learning (ML) algorithms or models.

There are many parallel ML algorithms and even more implementations and variations. The term parallel regarding models and/or algorithms pertains to running in a distributed or federated fashion on grids, clusters, clouds, etc. to increase performance. These ML algorithms and/or models differ in terms of required computing, memory, networking bandwidth, network latency, disk storage requirements, and special hardware (e.g., GPU, ASICs, etc.). For instance, a support vector machine (SVM) has high computational complexity, and relatively low memory requirements. A convolutional neural network (CNN) has medium computational complexity, and medium memory requirements; a K-nearest neighbor (KNN) neural network (NN) has high computational complexity, and a high memory requirement. Another example may involve federated learning vs. distributed learning—each has different network utilization patterns and, hence, different bandwidth and latency requirements. A further example is proportions of node-local resource requirements vs. total resource requirements, and ideal distribution characteristics (e.g., homogeneous distribution). Consequently, different parallel ML algorithms, and even different implementations of the same algorithm, perform differently: depending on the specific ML problems they are applied on (i.e., the data); and depending on different hardware configurations and architectures.

SUMMARY

Embodiments relate to fair comparison for parallel machine learning models. One embodiment provides a method of using a computing device to compare performance of multiple algorithms. The method includes receiving, by a computing device, multiple machine to assess. The computing device further receives a total amount of resources to allocate to the multiple algorithms. The computing device additionally assigns a fair share of the total amount of resources to each of the multiple algorithms. The computing device still further executes each of the multiple algorithms using the assigned fair share of the total amount of resources. The computing device additionally compares the performance of each of the multiple algorithms based on at least one of multiple hardware relative utility metrics describing a hardware relative utility of any given resource allocation for each of the multiple algorithms. The embodiments significantly improve benchmarking and/or comparing different algorithms simultaneously in a fair and distributed manner. As a result, the embodiments significantly provide that when dividing limited, distributed computing resources across different (parallel) algorithms (such as algorithms or models including, but not limited to: machine learning (ML), simulation or searching) such that bias stemming from different ideal hardware requirements/preferences is eliminated or mitigated. Some features consider the (negative) impact of higher degrees of distribution and resource heterogeneity in an optimization ML model and contribute to the advantage of improving "fairness." Some other features contribute to the advantage of ML algorithms or models being simultaneously compared with respect to their performance (e.g., accuracy) using the same, single pool of resources.

One or more of the following features may be included. In some embodiments, the method may further include that the multiple algorithms include machine learning algorithms, simulation algorithms or search algorithms. The performance of each of the algorithms is compared in terms of time of execution, accuracy, metrics or a combination thereof.

In some embodiments, the method may further include that input for each of the multiple algorithms comprises a set of resource types and a resource bundle that includes required hardware resources.

In one or more embodiments, the method may further include that the input for each of the algorithms further comprises a resource preference profile including the multiple hardware relative utility metrics, that bias stemming from different hardware requirements or preferences for the multiple algorithms is eliminated or mitigated, and the multiple hardware relative utility metrics is based on a resource allocation index, a resource distribution index and a resource variance index.

In one or more embodiments, the method may include computing an optimum overall resource allocation as a pareto-optimal, equitable or relaxed-equitable distribution of relative hardware utilities across the multiple algorithms according to the multiple hardware relative utility metrics.

In some embodiments, the method may further include determining an optimal allocation of hardware resources to each of the multiple algorithms in multiplicities of resource bundles.

These and other features, aspects and advantages of the present embodiments will become understood with reference to the following description, appended claims and accompanying figures.

BRIEF DESCRIPTION OF THE DRAWINGS

FIG. 3 illustrates an example of a resource preference profile, according to one embodiment;

FIG. 4 illustrates an equation for subjective utility given to a specific allocation of resources ($S_i$) by machine learning (ML) algorithm (i) according to the relative utility parameter ($v_i^k$) in its respective resource preference profile ($RPP_i$), according to one embodiment;

DETAILED DESCRIPTION

Figure 1:
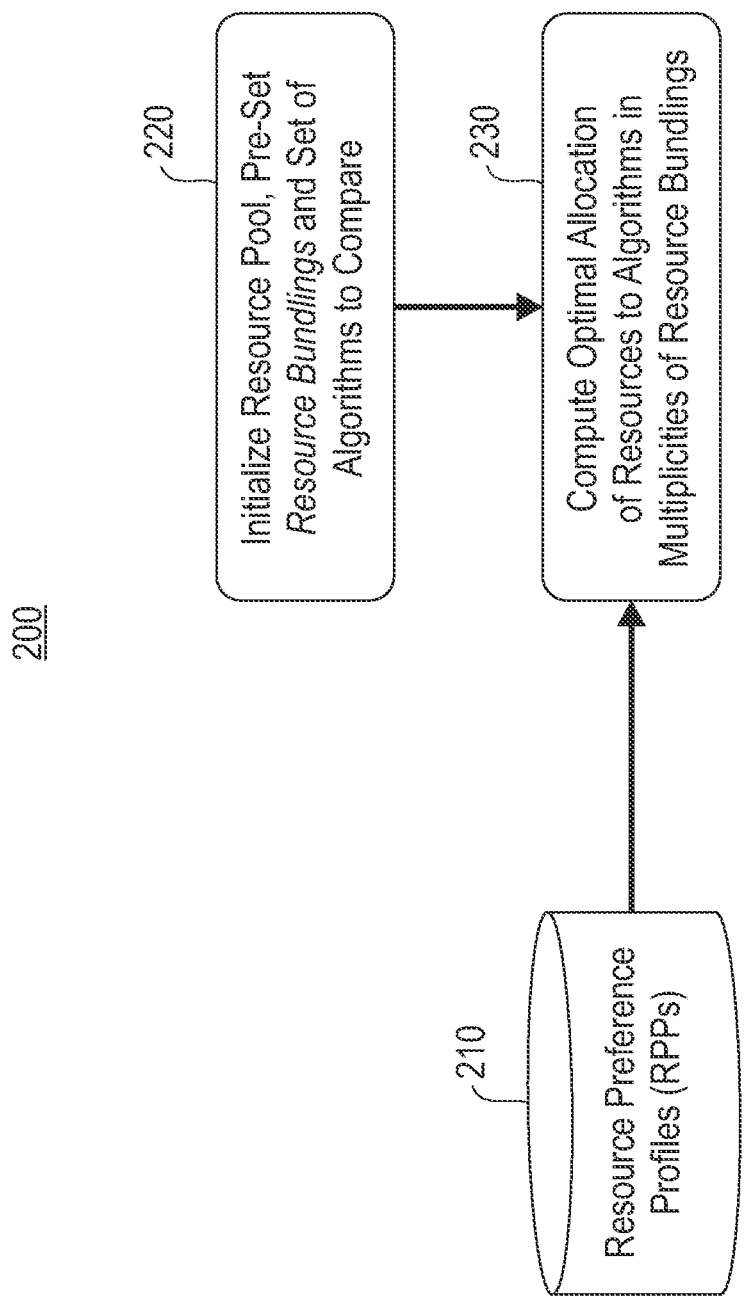
FIG. 1 illustrates a block diagram of a process for fair comparison of different models or algorithms performed in parallel, according to one embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments relate to fair comparison for parallel algorithms. One embodiment provides a method of using a computing device to compare performance of multiple algorithms. The method includes receiving, by a computing device, multiple algorithms to assess. The computing device further receives a total amount of resources to allocate to the multiple algorithms. The computing device additionally assigns a fair share of the total amount of resources to each of the multiple algorithms. The computing device still further executes each of the multiple algorithms using the assigned fair share of the total amount of resources. The computing device additionally compares the performance of each of the multiple algorithms based on at least one of multiple hardware relative utility metrics describing a hardware relative utility of any given resource allocation for each of the multiple algorithms.

One or more of the following features may be included. In some embodiments, the method may further include that the multiple algorithms include machine learning (ML) algorithms (or models), simulation algorithms (or models) or search algorithms (or models). The performance of each of the algorithms is compared in terms of time of execution, accuracy, metrics or a combination thereof.

In some embodiments, the method may further include that input for each of the multiple algorithms comprises a set of resource types and a resource bundle that includes required hardware resources.

In one or more embodiments, the method may further include that the input for each the multiple algorithms further comprises a resource preference profile including the multiple hardware relative utility metrics, that bias stemming from different hardware requirements or preferences for the multiple algorithms is eliminated or mitigated, and the multiple hardware relative utility metrics is based on a resource allocation index, a resource distribution index and a resource variance index.

In one or more embodiments, the method may include computing an optimum overall resource allocation as a pareto-optimal, equitable or relaxed-equitable distribution of relative hardware utilities across the multiple algorithms according to the multiple hardware relative utility metrics.

In some embodiments, the method may further include determining an optimal allocation of hardware resources to each of the multiple algorithms in multiplicities of resource bundles.

One or more embodiments relate to ML models or algorithms that employ one or more artificial intelligence (AI) models or algorithms. AI models may include a trained ML model (e.g., models, such as an NN, a CNN, a recurrent NN (RNN), a Long short-term memory (LSTM) based NN, gate recurrent unit (GRU) based RNN, tree-based CNN, KNN, a self-attention network (e.g., a NN that utilizes the attention mechanism as the basic building block; self-attention networks have been shown to be effective for sequence modeling tasks, while having no recurrence or convolutions), BiLSTM (bi-directional LSTM), etc.). An artificial NN is an interconnected group of nodes or neurons.

One or more embodiments define a metric for fairness when comparing different parallel algorithms or models with respect to their performance in order to mitigate the bias towards a subset of algorithms or models that typically results from employing undifferentiated resource bundlings (including undifferentiated degrees of distribution) across algorithms or models. In some embodiments, a (pareto-) optimal, fair (i.e., equitable) division/mapping of different computing resources across a set of different parallel algorithms or models is determined: from a limited pool of resources, in multiplicities of pre-set, discrete resource bundlings, and while considering the relative impact of distribution overhead. Therefore, in one or more embodiments algorithms or models may be simultaneously compared with respect to their performance (e.g., accuracy) using the same, single pool of resources.

The approach of the embodiments significantly improves benchmarking and/or comparing different algorithms simultaneously in a fair and distributed manner. As a result, the embodiments significantly provide that when dividing limited, distributed computing resources across different (parallel) algorithms such that bias stemming from different ideal hardware requirements/preferences is eliminated or mitigated. Moreover, the embodiments consider the (negative) impact of higher degrees of distribution and resource heterogeneity in an optimization ML model to further improve "fairness."

Conventional interfaces display a comparison of different ML algorithms or models that are performed sequentially. Model/algorithm performance comparison is a crucial activity in ModelOps (i.e., the process of operationalizing ML models focused on the governance and management of life cycle of AI and decision models (models based on ML, learning graphs, rules, optimization agents and linguistics)) to select the best model for a production use case. Typically, different algorithms/implementations can be compared by some performance metric (e.g., receiver operator characteristic (ROC)-area under the curve (AUC) score) plotted over elapsed training time and/or until some predefined time-out occurs. Automated ML (the process of automating iterative tasks of ML model development) approaches can help set up those experiments in the ModelOps process. Current solutions for parallelized ML algorithm comparison run different ML algorithms either non-parallelized on a single node, or on generalized distributed infrastructures (e.g., an open-source software for reliable, scalable, distributed computing, open source framework focused on interactive query, ML, and real-time workloads): sequentially—where they train and test one algorithm at a time, then collect results at the end and compare performance results, which leads to a waste of the data scientist's time in ModelOps as compared to one or more embodiments employing parallel training and testing.

Without differentiation for different hardware requirements, the conventional techniques are all run on the same infrastructure (e.g., open-source software for reliable, scalable, distributed computing or open source framework focused on interactive query, ML, and real-time workloads abstracting away different memory requirements, different network bandwidth requirements, central processing unit (CPU), graphical processing unit (GPU), tensor processing unit (TPU), TrueNorth, edge devices, etc., of the different algorithms/models). This leads to unfair (i.e., biased) comparison of ML algorithms or model implementations because model training/prediction is performed on abstract hardware generalization that may be more favorable for some algorithms than for others, which is favoritism.

Further, conventional systems may employ resources for test runs of ML algorithms, which can be provisioned in an ad-hoc manner. In typical enterprise clouds, there is a total amount (or budget) of CPU, GPU, memory, network latency, network bandwidth, disks that can be allocated for a particular ModelOps use case. Users can provision virtual machines (VMs) with different pre-made configurations or configure Random Access Memory (RAM), disk, virtual CPU (vCPU), GPU, network, etc., themselves. This leads to a non-deterministic polynomial-time hardness (NP-hard) VM packing problem.

Depending on the implementation, parallel ML algorithms may employ model parallelism, data parallelism, or both (hybrid). Employed degree of data parallelism and model parallelism typically both negatively correlate with solution quality (i.e., out-of-sample prediction error on the aggregate model level given a limited budget for training time) depending on a myriad of factors, such as: batch size—either too small or too large, model and model hyperparameters, characteristics of the data itself (but under the conventional techniques it appears relatively unclear how data characteristics correlate with solution quality under varying degrees of parallelism). Conventional techniques mention that, for NN, an increase in batch size is a non-complex way to generate valuable speed increase across a range of workloads, but the benefits diminish within the limits of current hardware. This suggests that ML solution quality may often have some inverse correlation with the degree of distribution (e.g., the number of nodes and heterogeneity of nodes). This may not be true or equally true for all ML algorithms, but in one embodiment, assume this is a general property, and that more nodes have a negative impact.

Another question is: does it matter if resources are equally divided (e.g., even distribution across only a single type of VM flavors versus high variance in VM configurations across nodes)? It probably does, more so for some algorithms, less so for others; moreover, efficient scheduling across heterogeneous nodes is a practical challenge; hence, in one embodiment it is assumed that there is a generally a negative impact if nodes are heterogeneous.

Automated ML conventional approaches include automatically building ML pipelines and automatically selecting of an algorithm and hyperparameters, potentially with human-in-the-loop. Many of the conventional techniques are specifically focused on deep learning (DL). Some non-DL conventional approaches consider other algorithms, but do not consider fairness in terms of parallelization and resource allocation. Some of the typical approaches include: building a search space over algorithm/hyperparameter combinations; may use overall "time budgets" for the overall model/algorithm search/optimization procedure; time-out (or cut short for iteratively trained models) the evaluation of individual models/algorithms in the search space. It appears, however, that the problem of "fair" comparison of parallel ML algorithms with respect to "bias" in underlying hardware configurations in one or more embodiments has not yet been studied in current literature.

FIG. 1 illustrates a block diagram of a process 200 for fair comparison of different models or algorithms performed in parallel, according to one embodiment. In some embodiments, the inputs for process 200 include: a set of parallel ML algorithms/models I 330 (FIG. 3) to compare, a set of available resource types T 310 (FIG. 2) and corresponding total available pool of resources, definitions of pre-set resource bundles or "bundlings" B 320 (i.e., the allowed combinations of different resource types and corresponding resource amounts when provisioning resources), and resource preference profiles (RPP$_i$) 210 (e.g., stored in a storage device, cloud storage, a repository, etc.) for the ML algorithms as well as parameters $\lambda_{dist}$ and $\lambda_{var}$ that reflect the expected negative impact of resource distribution and resource variance on ML model/algorithm performance, respectively.

Figure 2:
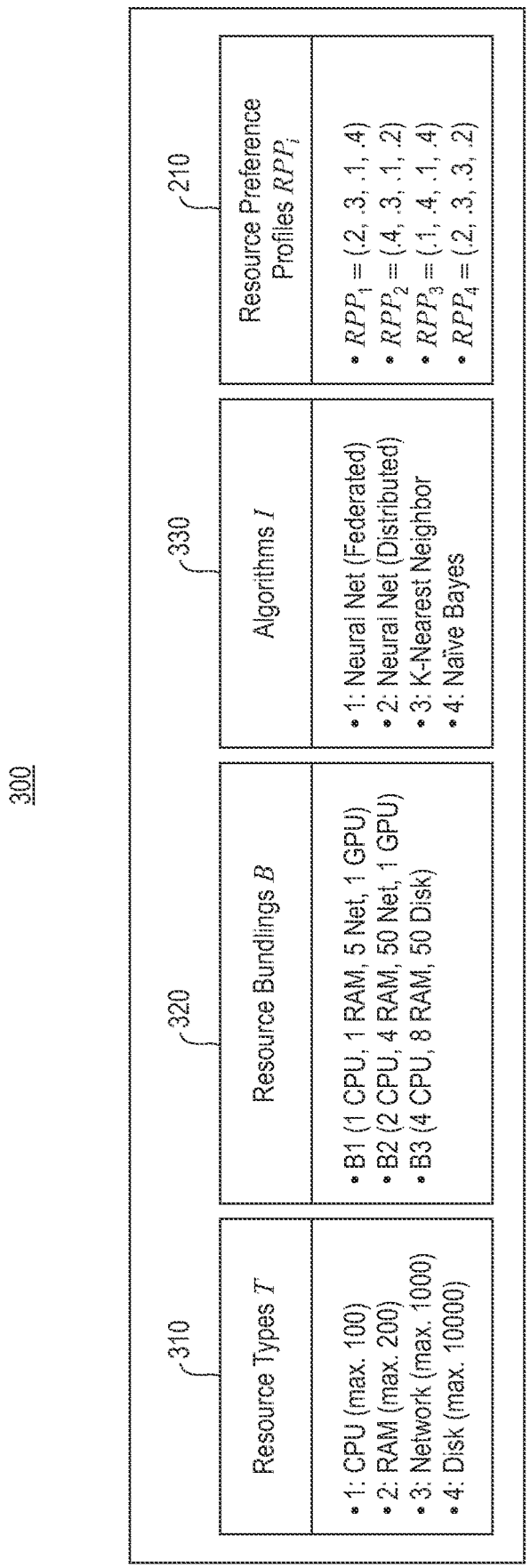
FIG. 2 illustrates an example of a pool of resources, a set of resource bundles, different ML models or algorithms and resource preference profiles, according to one embodiment.

FIG. 2 illustrates an example of a pool of resources 300 that includes: resource types T 310, a set of resource bundlings B 320, different ML algorithms/models I 330, and RPP$_i$ 210, according to one embodiment. In one example embodiment, the resource types T 310 includes resources types, such as CPU, RAM, network, disk, etc. In one example embodiment, the resource bundlings B 320 includes resource bundles each including various resource types and number of resources per type. In one example embodiment, the ML algorithms/models I 330 includes the different ML algorithms/models that will be compared in parallel. The RPP$_i$ 210 includes relative resource utility parameters ($v_i^k$) that have values between 0 and 1 (i.e., a percentage) for each ML algorithms/models I 330 and where the sum of all parameters ($v_i^k$) for a particular ML algorithm/model always equals 1 (i.e., 100%).

FIG. 3 illustrates an exemplar RPP$_i$ 210, according to one embodiment. In the exemplar RPPi 210, the resource type/ML algorithm or model 405 includes various types of ML algorithms/models I 330 of CNN-distributed 440, CNN-federated 450, kNN-parallel 460 and SVM-parallel 470. Other RPP$_i$s 210 may include other types of ML algorithms/models I 330. In the example embodiment, the top row of the RPP$_i$ 210 includes various utility percentages as follows: CPU utility % 410, memory utility % 415, node webkit (NW) node bandwidth utility % 420, disk utility % 425, GPU utility % 430 and the total % 435, which is 100% for each row. The RPP$_i$ 210 utility percentages are based on the type of ML algorithms/models I 330, which vary inherently in resource type utility usage.

Returning to FIG. 1, in one or more embodiments, the outputs for process 200 include: allocation of resources in the form of multiplicities of resource bundlings B 320 assigned to the individual parallel ML algorithms/models I 330 to be compared, and a metric for determining the relative "fairness" between above mentioned resource allocations.

In some embodiments, the process 200 uses the RPPs 210 of different ML algorithms, created from empirical evidence and/or theoretical considerations, in combination with mathematical optimization processing/processes in order to allow for fair simultaneous comparison of ML models/algorithms I 330 when dividing limited, distributed computing resources across different (parallel) ML algorithms such that bias stemming from different ideal hardware requirements/preferences is eliminated or mitigated; and further consider the (negative) impact of higher degrees of distribution and resource heterogeneity in the aforementioned optimization model to further improve "fairness."

In one or more embodiments, processing for block 220 of process 200 initializes the pool of resources 300 (FIG. 2)

including the resource types T 310, pre-set resource bundlings B 320 and the set of ML algorithms or models I 330 to compare. In one embodiment, processing for block 220 includes the following. Let T be the set of different resource types T 310 in the allocation pool of resources 300 (e.g., CPU, GPU, application specific integrated circuits (ASICs), RAM, network bandwidth, etc.) and t=|T|. The total available amount of each resource of type k (1≤k≤t) is $c_k$. Let B be the set of possible different discrete combinations of resource types (resource bundlings B 320, e.g., VM flavors) and m=|B|, e.g., B={$B_1$, $B_2$, ..., $B_m$}. A bundling $B_j$ (1≤j≤m) consumes $r_k^i$ amount of the resource of type k (1≤k≤t). Let I denote the set of ML algorithms or models competing for resources. Each algorithm i ∈ I has a RPP$_i$ 210 of the form RPP$_i$=($v_i^1$, $v_i^2$, ..., $v_i^t$) where $v_i^k$ ∈ ℝ, 0≤$v_i^k$≤1 represents the relative utility of resource type k (1≤k≤t) to algorithm i, where $\Sigma_{k=1}^t (v_i^k)$=1.

FIG. 4 illustrates an equation 500 for subjective utility $u_i(S_i)$ given to a specific allocation of resources ($S_i$) by ML algorithm (i) according to the relative utility parameter ($v_i^k$) in its respective resource preference profile (RPP$_i$) 210, according to one embodiment. In equation 500, reference 510 represents resource types, reference 520 represents resource allocation (where the index of the resource allocation is relative to the worst allocation (0 ... 1)), reference 530 represents the resource distribution (where the index of the resource distribution is relative to the best allocation (0 ... 1)), and reference 540 represents the resource variance (where the index of the resource variance is relative to the best allocation (0 ... 1)).

Returning to FIG. 1, in one embodiment, in block 230 process 200 computes the optimal allocation of resources to ML algorithms or models in multiplicities of resource bundlings B 320 (FIG. 2). In one embodiment, let $S_i$ be an allocation of resources for algorithm i ∈ I, i.e., a multiset $S_i$={$B_1^{n_i^1}$, $B_2^{n_i^2}$, ..., $B_m^{n_i^m}$} where parameter $n_i^j$ ∈ ℕ represents the multiplicity of allocated instances of some resource bundling $B_j$ (1≤j≤m) that is assigned to ML algorithm or model i ($n_i^j$ may be zero). Let S denote the set of all multisets $S_i$. Let $u_i(S_i)$ be the subjective utility given to a specific allocation of resources $S_i$ by ML algorithm or model i according to the parameter $v_i^k$ in its respective RPP$_i$ 210 for equation 500 ($u_i(S_i)$=$\Sigma_{k=1}^t$ max (0, $v_i^k$*allocIdx$_k$($S_i$|S)−$\lambda_{dist}$*distIdx($S_i$|S)−$\lambda_{var}$*varIdx$_k$($S_i$|S)))).

In some embodiments, block 230 of process 200 maximizes $\Sigma_{i \in I} u_i(S_i)$ by finding the set S of multisets $S_i$ with optimal parameters $n_i^j$ $^{s.t.}$ $\forall (i_1, i_2) \in I^2$ $\wedge i_1 \neq i_2$:|u(($S_{i_1}$)−u($S_{i_2}$)|≤ϵ (equitable distribution up to a difference of ϵ), and ∀ k ∈ ℕ ∧1≤k≤t: $\Sigma_{i \in I} \Sigma_{j=1}^m (n_i^j * r_k^j)$≤$c_k$ (respect total capacity of resource pool). Note that the parameters $\lambda_{dist}$ and $\lambda_{var}$ may be estimated or learned and range from 0 (no impact) to 1 (max impact).

In one or more embodiments, the resource allocation index 520 refers to how much of a resource has been assigned to a particular ML algorithm or model as compared to others. The resource allocation index 520 has a range from 0 ... 1, higher is better, 0 is minimal, 1 is highest relative resource allocation:

$$alloc_k(S_i) = \sum_{j=1}^m (n_i^j * r_k^j)$$

$$allocIdx_k(S_i|S) = \frac{alloc_k(S_i) - \min_{S_{min} \in S} alloc_k(S_{min})}{\max_{S_{max} \in S} alloc_k(S_{max}) - \min_{S_{min} \in S} alloc_k(S_{min})}.$$

In one or more embodiments, the resource distribution index 530 refers to over how many instances of resource bundlings B 320 (FIG. 2) is the i-th workload distributed in comparison to the least distributed workload of all. It should be noted that $n_i^j$ specifies multiplicities of resource bundlings B 320 in resource allocation $S_i$. The range for the resource distribution index 530 is from 0 ... 1, lower is better, 0 is minimal, 1 is maximally distributed:

$$distIdx(S_i|S) = \frac{\sum_{j=1}^m (n_i^j) - \min_{S_{min} \in S} \sum_{j=1}^m (n_{min}^j)}{\max_{S_{max} \in S} \sum_{j=1}^m (n_{max}^j) - \min_{S_{min} \in S} \sum_{j=1}^m (n_{min}^j)}$$

In some embodiments, the resource variance index 540 refers to how large is the variance in the resource configuration of the instances of resource bundlings B 320 that are assigned to a particular workload as compared to the least variance in the set of all workloads. The range for the resource variance index 540 is from 0 ... 1, lower is better, 0 is minimal, 1 is maximal relative variance:

$$var_k(S) = \sigma^2 \left\{ n_i^j * r_k^j \,\middle|\, B_x^{n_i^j} \in S, 1 \leq j \leq m \wedge j \in \mathbb{N} \right\}$$

$$varIdx_k(S_i|S) = \frac{var_k(S_i) - \min_{S_{min} \in S} var_k(S_{min})}{\max_{S_{max} \in S} var_k(S_{max}) - \min_{S_{min} \in S} var_k(S_{min})}.$$

In some embodiments, various use cases for process 200 (FIG. 1) are as follows. An interface may be employed for products that compare ML algorithms or models. Process 200 may be employed for products where the metric for fairness with respect to the bias in comparing different ML algorithms or models are used on undifferentiated hardware architectures. Process 200 may additionally be used for products for benchmarking ML algorithms and models. Process 200 may be used for AI (e.g., a "robot data scientist") to automatically select the right ML technology for automatically designing a particular ML solution by comparing different ML algorithms or models. Process 200 may further be used for products for automatically estimating the amount of required resources in an enterprise cloud to reach a certain goal with respect to required learning performance (i.e., accuracy) given a ML algorithm or model and a desired timeframe for training. Process 200 may also be used for transforming a process that is currently completely ad-hoc and manual, namely the selection and provisioning of hardware resources/configurations for specific enterprise ML solutions, into an automated, deterministic, and well-governed process.

Figure 5:
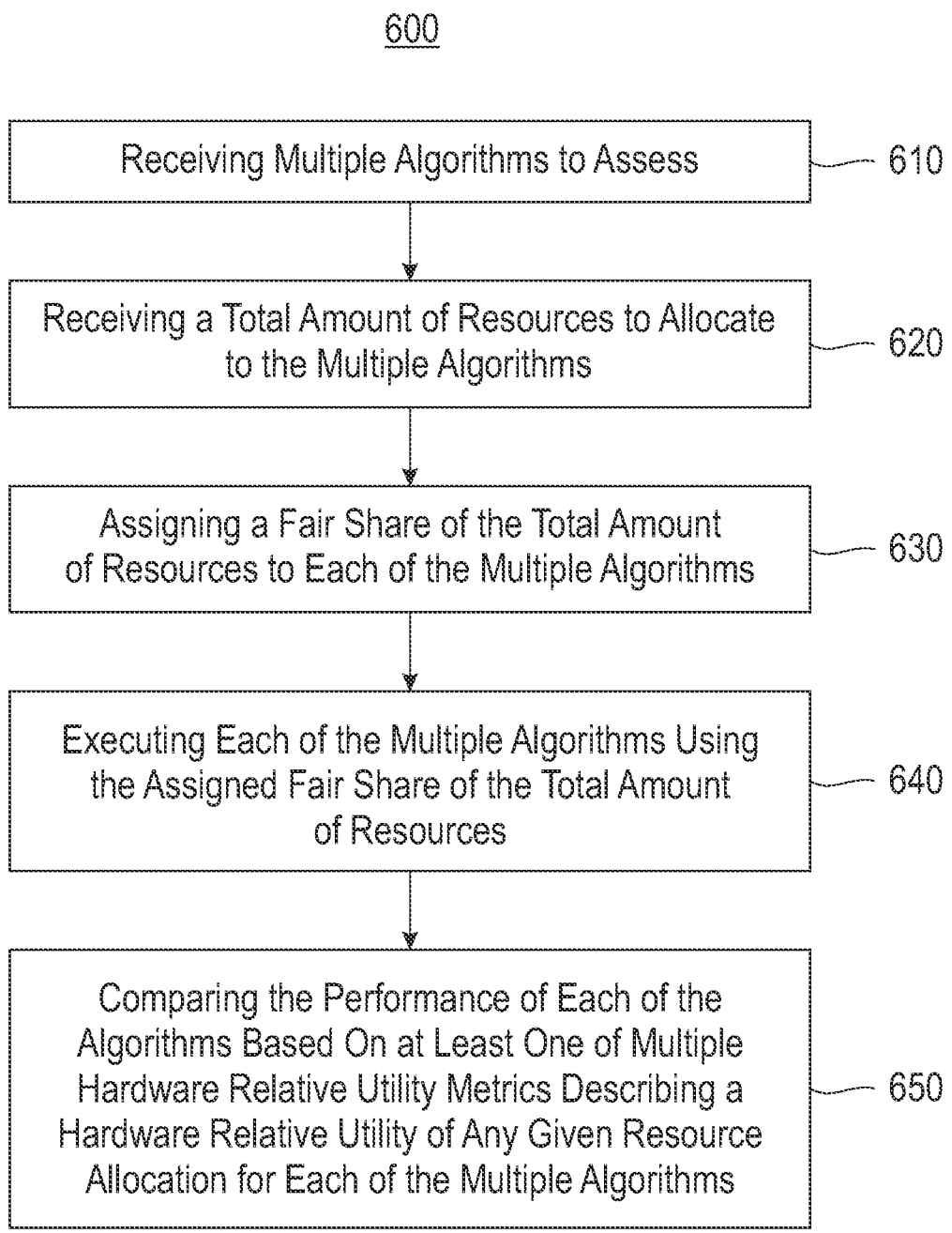
FIG. 5 illustrates a block diagram of a process for determining the relative fairness between different resource allocations for different algorithms and/or models to be compared, according to one embodiment.

FIG. 5 illustrates a block diagram of a process 600 for determining the relative fairness between different resource allocations for different algorithms and/or models to be compared, according to one embodiment. In one embodiment, in block 610, process 600 receives, by a computing device (from computing node 10, FIG. 6, hardware and software layer 60, FIG. 7, processing system 900, FIG. 8, system 1000, FIG. 9, system 1100, FIG. 10, etc.) multiple machine learning algorithms to assess (e.g., algorithms or models I 330, FIG. 2). In block 620, process 600 further provides receiving, by the computing device, a total amount of resources to allocate to the multiple algorithms. In block 630, process 600 further provides assigning, by the computing device, a fair share of the total amount of resources (e.g., using $RRP_i$ 210, FIGS. 2-3) to each of the multiple algorithms. In block 640, process 600 additionally provides executing, by the computing device, each of the multiple algorithms using the assigned fair share of the total amount of resources. In block 650, process 600 further provides comparing, by the computing device, the performance of each of the multiple algorithms based on at least one of multiple hardware relative utility metrics describing a hardware relative utility of any given resource allocation for each of the multiple algorithms.

In one embodiment, process 600 may further include the feature that the multiple algorithms comprise machine learning algorithms, simulation algorithms or search algorithms. The performance of each of the algorithms is compared in terms of time of execution, accuracy, metrics or a combination thereof.

In one embodiment, process 600 may additionally include the feature that input for each of the multiple algorithms includes a set of resource types (e.g., resource types T 300, FIG. 2) and a resource bundle (e.g., resource bundlings B 320, FIG. 2) that includes required hardware resources.

In one embodiment, process 600 may still additionally include the feature that the input for each the multiple algorithms further includes a resource preference profile (e.g., using $RRP_i$ 210, FIGS. 2-3) including a plethora of hardware relative utility metrics, bias stemming from different hardware requirements or preferences for the multiple algorithms is eliminated or mitigated, and that the plethora of hardware relative utility metrics is based on a resource allocation index (e.g., resource allocation index 520, FIG. 4), a resource distribution index (e.g., resource distribution index 530, FIG. 4) and a resource variance index (e.g., resource variance index 540, FIG. 4).

In one embodiment, process 600 may further include the feature of computing, by the computing device, an optimum overall resource allocation as a pareto-optimal, equitable or relaxed-equitable distribution of relative hardware utilities across the multiple algorithms according to the plethora of hardware relative utility metrics.

In one embodiment, process 600 may still further include the feature of determining, by the computing device, an optimal allocation of hardware resources to each of the multiple algorithms in multiplicities of resource bundles.

It is understood in advance that although this disclosure includes a detailed description of cloud computing, implementation of the teachings recited herein are not limited to a cloud computing environment. Rather, embodiments of the present embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models. Characteristics are as Follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.
Service Models are as Follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).
Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Figure 6:
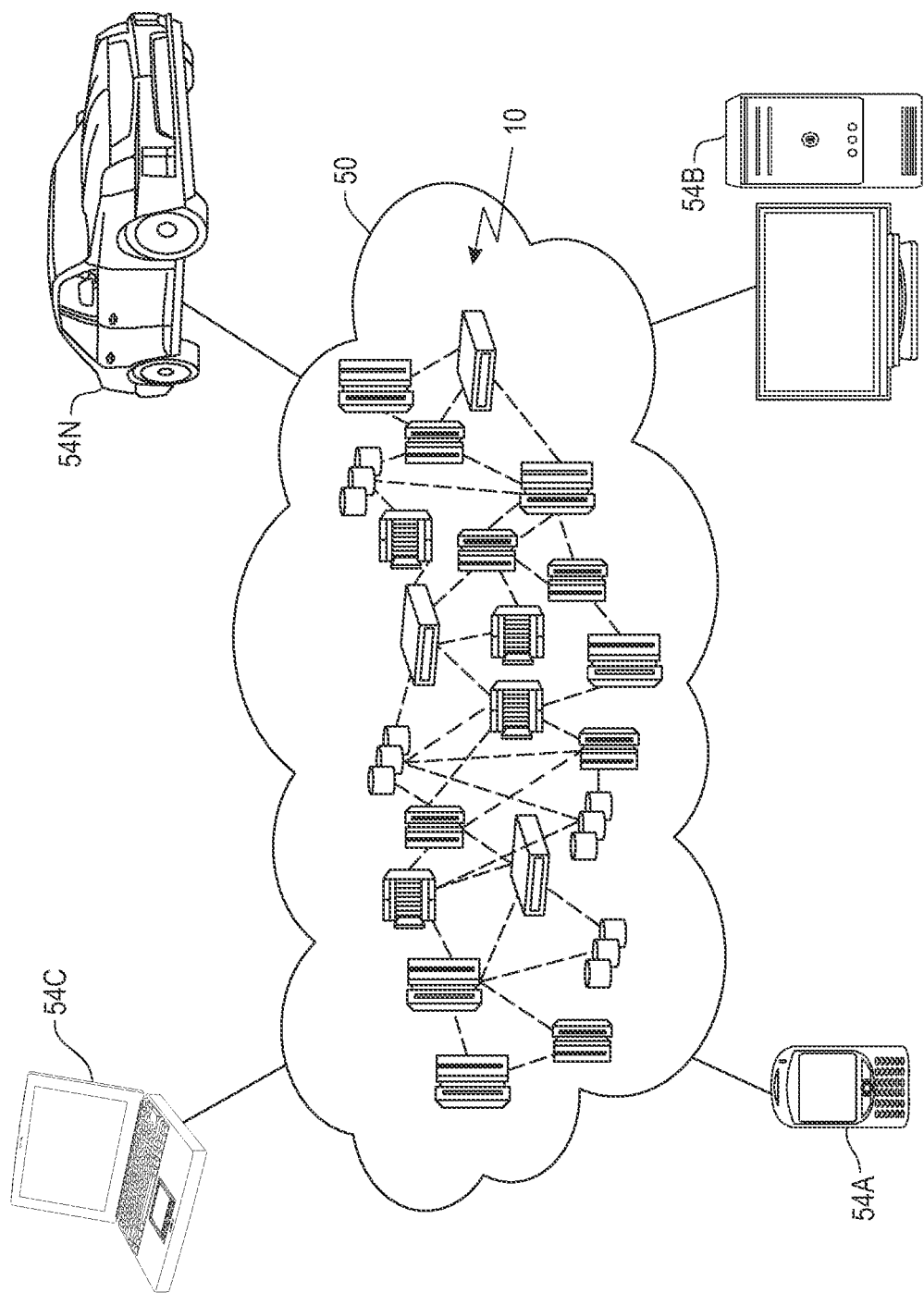
FIG. 6 depicts a cloud computing environment, according to an embodiment.

Referring now to FIG. 6, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
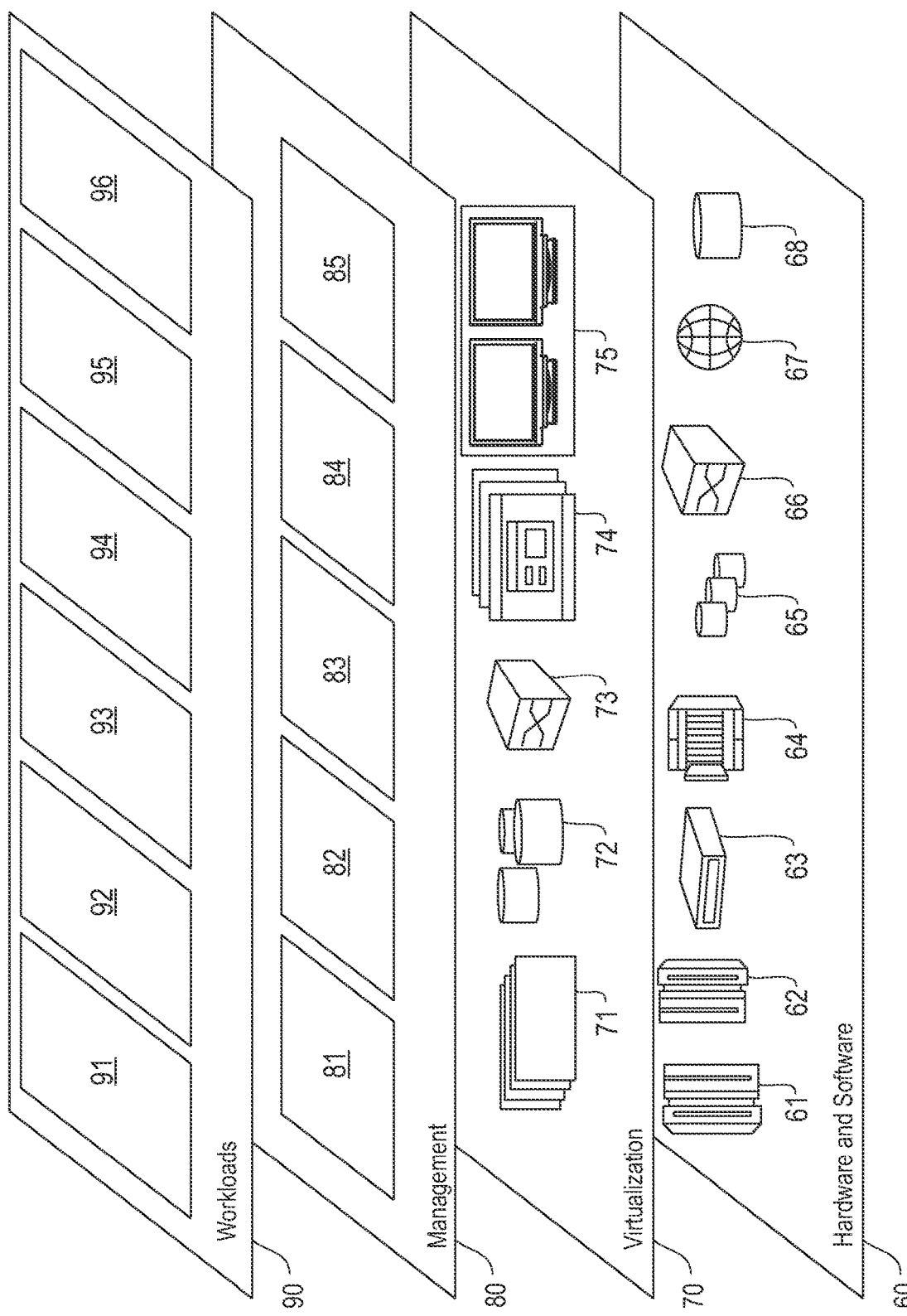
FIG. 7 depicts a set of abstraction model layers, according to an embodiment.

Referring now to FIG. 7, a set of functional abstraction layers provided by the cloud computing environment 50 (FIG. 6) is shown. It should be understood in advance that the components, layers, and functions shown in FIG. 7 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and for measurement of the relative fairness between different resource allocations for different ML algorithms and/or models to be compared processing 96 (see, e.g., process 600, FIG. 5, system 900, FIG. 8, system 1000, FIG. 9, system 1100, FIG. 10, etc.). As mentioned above, all of the foregoing examples described with respect to FIG. 7 are illustrative only, and the embodiments are not limited to these examples.

It is reiterated that although this disclosure includes a detailed description on cloud computing, implementation of the teachings recited herein are not limited to a cloud computing environment. Rather, the embodiments may be implemented with any type of clustered computing environment now known or later developed.

Figure 8:
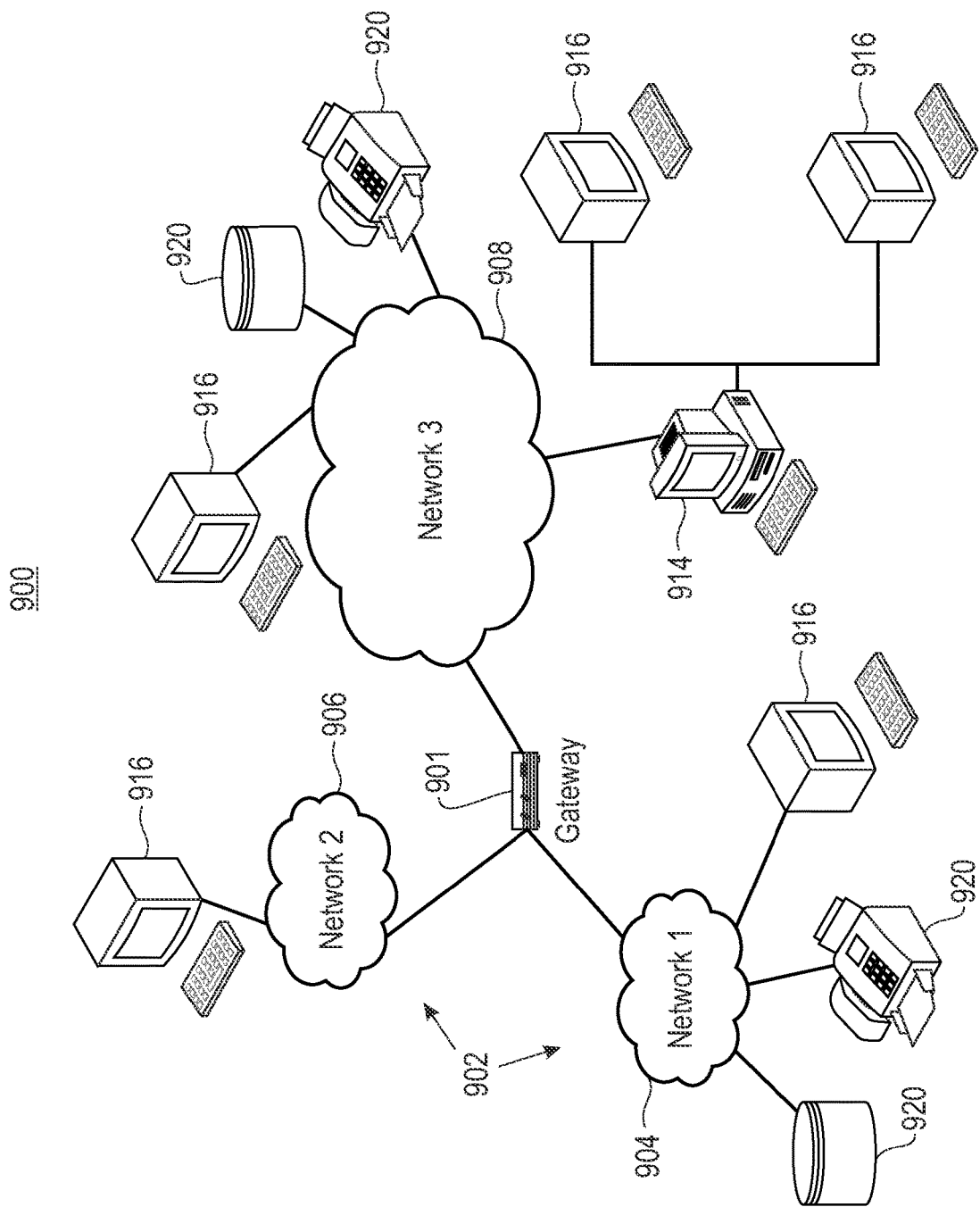
FIG. 8 is a network architecture of a system for determining the relative fairness between different resource allocations for different ML algorithms and/or models to be compared, according to an embodiment.

FIG. 8 is a network architecture of a system 900 for determining the relative fairness between different resource allocations for different ML algorithms and/or models to be compared, according to an embodiment. As shown in FIG. 8, a plurality of remote networks 902 are provided, including a first remote network 904 and a second remote network 906. A gateway 901 may be coupled between the remote networks 902 and a proximate network 908. In the context of the present network architecture 900, the networks 904, 906 may each take any form including, but not limited to, a LAN, a WAN, such as the Internet, public switched telephone network (PSTN), internal telephone network, etc.

In use, the gateway 901 serves as an entrance point from the remote networks 902 to the proximate network 908. As such, the gateway 901 may function as a router, which is capable of directing a given packet of data that arrives at the gateway 901, and a switch, which furnishes the actual path in and out of the gateway 901 for a given packet.

Further included is at least one data server 914 coupled to the proximate network 908, which is accessible from the remote networks 902 via the gateway 901. It should be noted that the data server(s) 914 may include any type of computing device/groupware. Coupled to each data server 914 is a plurality of user devices 916. Such user devices 916 may include a desktop computer, laptop computer, handheld computer, printer, and/or any other type of logic-containing device. It should be noted that a user device 916 may also be directly coupled to any of the networks in some embodiments.

A peripheral 920 or series of peripherals 920, e.g., facsimile machines, printers, scanners, hard disk drives, networked and/or local storage units or systems, etc., may be coupled to one or more of the networks 904, 906, 908. It should be noted that databases and/or additional components may be utilized with, or integrated into, any type of network element coupled to the networks 904, 906, 908. In the context of the present description, a network element may refer to any component of a network.

According to some approaches, methods and systems described herein may be implemented with and/or on virtual systems and/or systems, which emulate one or more other systems, such as a UNIX® system that emulates an IBM® z/OS environment, a UNIX® system that virtually hosts a MICROSOFT® WINDOWS® environment, a MICROSOFT® WINDOWS® system that emulates an IBM® z/OS environment, etc. This virtualization and/or emulation may be implemented through the use of VMWARE® software in some embodiments.

Figure 9:
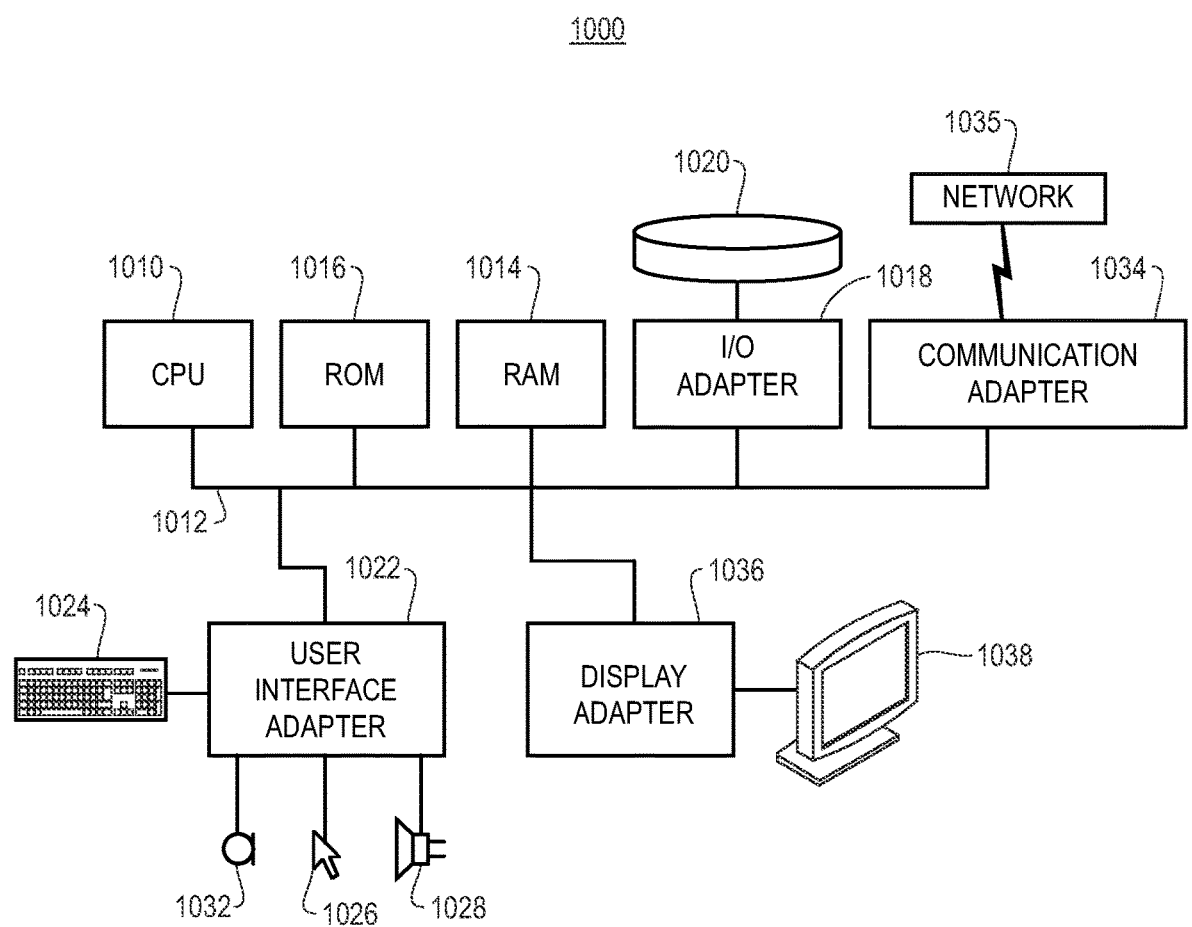
FIG. 9 shows a representative hardware environment that may be associated with the servers and/or clients of FIG. 6, according to an embodiment.

FIG. 9 shows a representative hardware system 1000 environment associated with a user device 916 and/or server 914 of FIG. 8, in accordance with one embodiment. In one example, a hardware configuration includes a workstation having a central processing unit 1010, such as a microprocessor, and a number of other units interconnected via a system bus 1012. The workstation shown in FIG. 9 may include a Random Access Memory (RAM) 1014, Read Only Memory (ROM) 416, an I/O adapter 1018 for connecting peripheral devices, such as disk storage units 1020 to the bus 1012, a user interface adapter 1022 for connecting a keyboard 1024, a mouse 1026, a speaker 1028, a microphone 1032, and/or other user interface devices, such as a touch screen, a digital camera (not shown), etc., to the bus 1012, communication adapter 1034 for connecting the workstation to a communication network 1035 (e.g., a data processing network) and a display adapter 1036 for connecting the bus 1012 to a display device 1038.

In one example, the workstation may have resident thereon an operating system, such as the MICROSOFT® WINDOWS® Operating System (OS), a MAC OS®, a UNIX® OS, etc. In one embodiment, the system 1000 employs a POSIX® based file system. It will be appreciated that other examples may also be implemented on platforms and operating systems other than those mentioned. Such other examples may include operating systems written using JAVA®, XML, C, and/or C++ language, or other programming languages, along with an object oriented programming methodology. Object oriented programming (OOP), which has become increasingly used to develop complex applications, may also be used.

Figure 10:
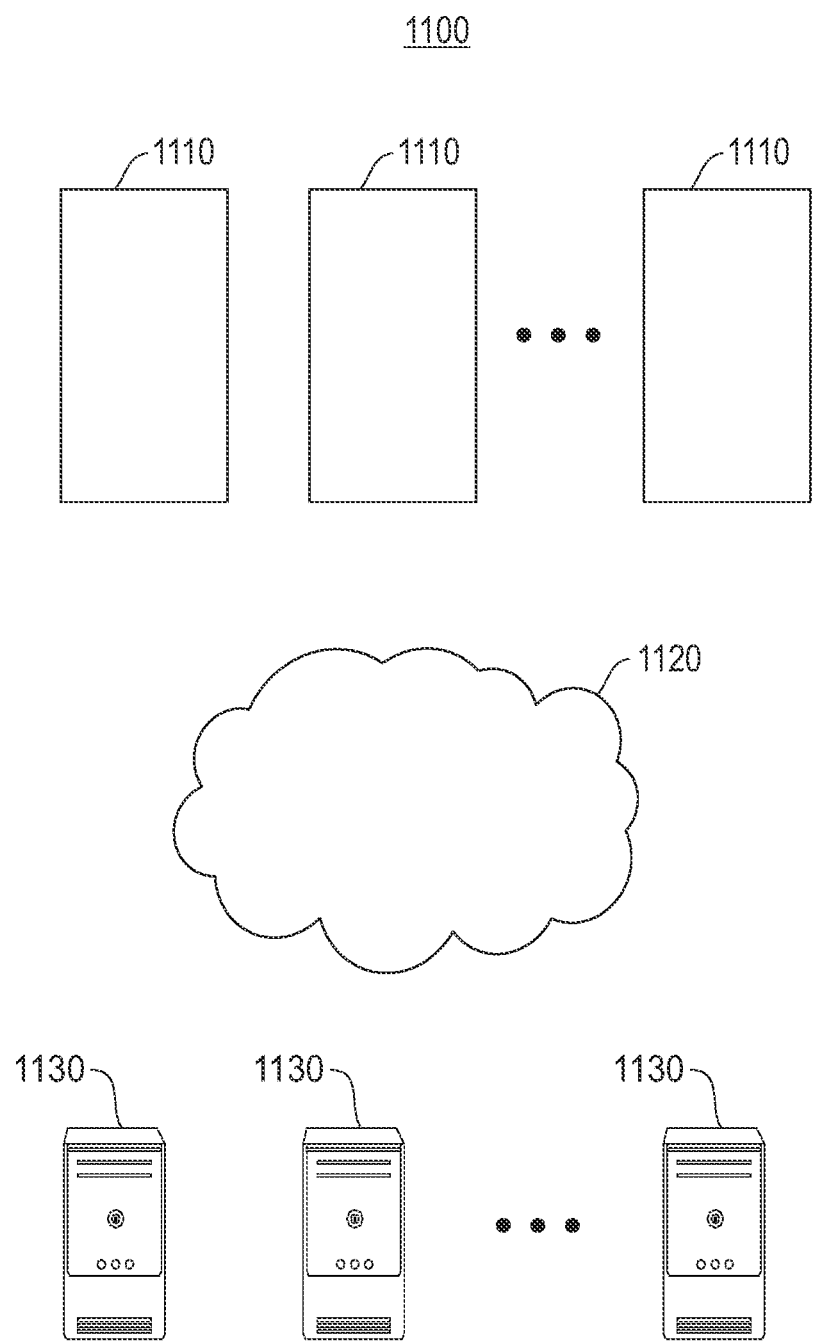
FIG. 10 is a block diagram illustrating a distributed system for determining the relative fairness between different resource allocations for different ML algorithms and/or models to be compared, according to one embodiment.

FIG. 10 is a block diagram illustrating a distributed system 1100 for determining the relative fairness between different resource allocations for different ML algorithms and/or models to be compared, according to one embodiment. In one embodiment, the system 1100 includes client devices 1110 (e.g., mobile devices, smart devices, computing systems, etc.), a cloud or resource sharing environment 1120 (e.g., a public cloud computing environment, a private cloud computing environment, a data center, etc.), and servers 1130. In one embodiment, the client devices 1110 are provided with cloud services from the servers 1130 through the cloud or resource sharing environment 1120.

One or more embodiments may be a system, a method, and/or a computer program product at any possible technical detail level of integration. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated.

What is claimed is:

1. A method executed by a computing device comprising:
   receiving a plurality of machine learning (ML) algorithms;
   receiving a total amount of hardware resources; and
   executing each of the plurality of ML algorithms using a respective percentage of the total amount of hardware resources, wherein:
   input for each of the plurality of ML algorithms comprises a resource preference profile that includes a plurality of hardware relative utility metrics,
   the plurality of hardware relative utility metrics is based on a resource allocation index, a resource distribution index, and a resource variance index,
   bias stemming from different hardware requirements or preferences for each of the plurality of ML algorithms is eliminated or mitigated,
   the respective performance of each of the plurality of ML algorithms associated with the execution is based on at least one of the plurality of hardware relative utility metrics describing a hardware relative utility of any given resource allocation for each of the plurality of ML algorithms, and
   a particular ML solution is based on the plurality of ML algorithms.

2. The method of claim 1, wherein the plurality of ML algorithms comprises, simulation algorithms or search algorithms.

3. The method of claim 2, wherein the performance of each of the plurality of ML algorithms is measured in terms of time of execution, accuracy, or a combination thereof.

4. The method of claim 2, wherein the input for each of the plurality of ML algorithms further comprises a set of resource types and a resource bundle that includes required hardware resources for the plurality of ML algorithms.

5. The method of claim 4,
   wherein an optimum overall hardware resource allocation for the plurality of ML algorithms is based on a pareto-optimal, equitable, or relaxed-equitable distribution of relative hardware utilities across the plurality of ML algorithms according to the plurality of hardware relative utility metrics.

6. The method of claim 1, wherein an optimal allocation of hardware resources to each of the plurality of ML algorithms is based on multiplicities of hardware resource bundles.

7. A computer program product comprising a computer readable storage medium having program instructions embodied therewith, the program instructions executable by a processor to cause the processor to:

receive a plurality of machine learning (ML) algorithms;

receive a total amount of hardware resources; and execute each of the plurality of ML algorithms using a respective percentage of the total amount of hardware resources, wherein:

input for each of the plurality of ML algorithms comprises a resource preference profile that includes a plurality of hardware relative utility metrics, the plurality of hardware relative utility metrics is based on a resource allocation index, a resource distribution index, and a resource variance index, bias stemming from different hardware requirements or preferences for each of the plurality of ML algorithms is eliminated or mitigated, the respective performance of each of the plurality of ML algorithms associated with the execution is based on at least one of the plurality of hardware relative utility metrics describing a hardware relative utility of any given resource allocation for each of the plurality of ML algorithms, and a particular ML solution is based on the plurality of ML algorithms.

8. The computer program product of claim 7, wherein the plurality of ML algorithms comprises simulation algorithms or search algorithms.

9. The computer program product of claim 8, wherein the performance of each of the plurality of ML algorithms is measured in terms of time of execution, accuracy, or a combination thereof.

10. The computer program product of claim 8, wherein the input for each of the plurality of ML algorithms further comprises a set of resource types and a resource bundle that includes required hardware resources for the plurality of ML algorithms.

11. The computer program product of claim 10, wherein an optimum overall hardware resource allocation for the plurality of ML algorithms is based on a pareto-optimal, equitable, or relaxed-equitable distribution of relative hardware utilities across the plurality of ML algorithms according to the plurality of hardware relative utility metrics.

12. The computer program product of claim 7, wherein an optimal allocation of hardware resources to each of the plurality of ML algorithms is based on multiplicities of hardware resource bundles.

13. An apparatus comprising:
a memory configured to store instructions; and
a processor configured to execute the instructions to:

receive a plurality of machine learning (ML) algorithms;

receive a total amount of hardware resources; and execute each of the plurality of ML algorithms using a respective percentage of the total amount of hardware resources, wherein:

input for each of the plurality of ML algorithms comprises a resource preference profile that includes a plurality of hardware relative utility metrics, the plurality of hardware relative utility metrics is based on a resource allocation index, a resource distribution index, and a resource variance index, bias stemming from different hardware requirements or preferences for each of the plurality of ML algorithms is eliminated or mitigated, the respective performance of each of the plurality of ML algorithms associated with the execution is based on at least one of the plurality of hardware relative utility metrics describing a hardware relative utility of any given resource allocation for each of the plurality of ML algorithms, and a particular ML solution is based on the plurality of ML algorithms.

14. The apparatus of claim 13, wherein the plurality of ML algorithms comprises simulation algorithms or search algorithms.

15. The apparatus of claim 14, wherein the performance of each of the plurality of ML algorithms is measured in terms of time of execution, accuracy, or a combination thereof.

16. The apparatus of claim 14, wherein the input for each of the plurality of ML algorithms further comprises a set of resource types and a resource bundle that includes required hardware resources for the plurality of ML algorithms.

17. The apparatus of claim 16, wherein an optimum overall hardware resource allocation for the plurality of ML algorithms is based on a pareto-optimal, equitable, or relaxed-equitable distribution of relative hardware utilities across the plurality of ML algorithms according to the plurality of hardware relative utility metrics.

18. The apparatus of claim 13, wherein an optimal allocation of hardware resources to each of the plurality of ML algorithms is based on multiplicities of hardware resource bundles.

* * * * *